United States Patent [19]

Turek

[11] 4,266,952
[45] May 12, 1981

[54] APPARATUS OPERATING WITH AN ADSORBENT SUBSTANCE FOR PURIFYING AIR

[76] Inventor: Klaus Turek, Marsstrasse 52, 5620 Velbert, Fed. Rep. of Germany

[21] Appl. No.: 751,713

[22] Filed: Dec. 17, 1976

[51] Int. Cl.³ .............................................. B01D 53/04
[52] U.S. Cl. ......................................... 55/179; 55/387; 210/264; 210/284
[58] Field of Search ............... 55/74, 75, 79, 179, 55/180, 181, 387, 390; 210/189, 264, 268, 283, 284, 289

[56] References Cited

U.S. PATENT DOCUMENTS

| | | | |
|---|---|---|---|
| 1,146,363 | 7/1915 | Statham | 210/289 X |
| 1,499,600 | 7/1924 | Smith | 210/284 X |
| 1,616,242 | 2/1927 | Voress et al. | 55/59 |
| 1,688,012 | 10/1928 | Gray | 210/284 X |
| 2,428,885 | 10/1947 | Luaces | 55/59 X |
| 2,780,310 | 2/1957 | Schaub | 55/79 X |
| 2,834,119 | 5/1958 | Schaub | 55/79 X |
| 3,621,585 | 11/1971 | Robertson | 55/179 X |
| 3,716,969 | 2/1973 | Maeda | 55/390 |
| 3,912,472 | 10/1975 | Marble | 55/387 X |
| 3,948,775 | 4/1976 | Otani et al. | 210/284 X |

*Primary Examiner*—Robert H. Spitzer
*Attorney, Agent, or Firm*—Charles Hieken

[57] ABSTRACT

The invention concerns apparatus for purifying air and other gas laden with an adsorbate using active charcoal or other adsorbent in a tank comprising an inlet chamber, an adsorbent chamber and an outlet chamber arranged juxtaposed in side-by-side arrangement and extending from one end of the tank to the other with end cover closures containing the connection zones for the inlet and outlet of the gas and the adsorbent substance. The tank comprises a plurality of sections connectable to one another by flanged connections so that a tank of any length can be made to suit a desired throughput capacity. The adsorbent chamber may be vertical, inclined or zigzag. In addition to connection zones at the ends of the tank, tank sections with lateral connections may be provided intermediate the ends of the tank.

17 Claims, 14 Drawing Figures

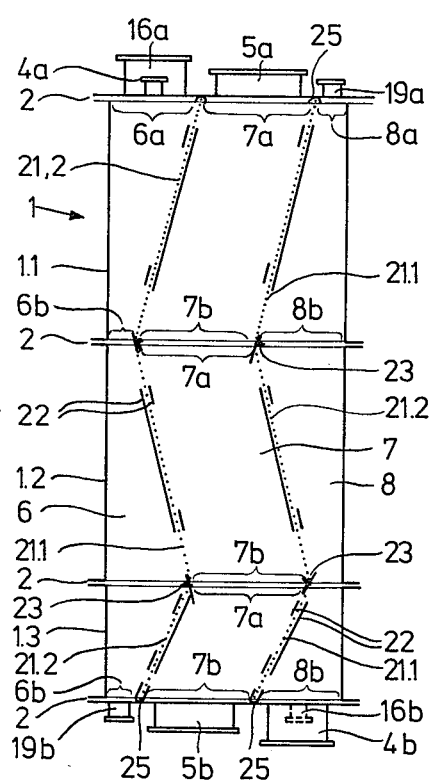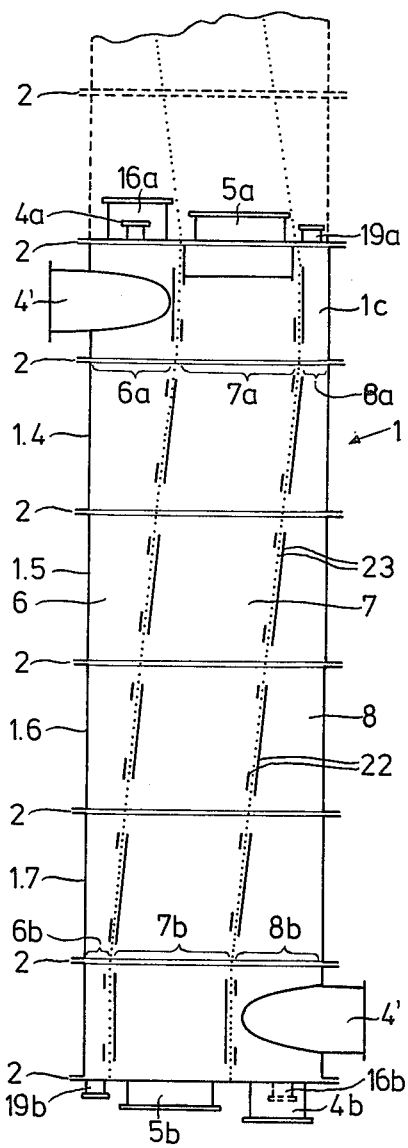
FIG. 3
FIG. 4
FIG. 8

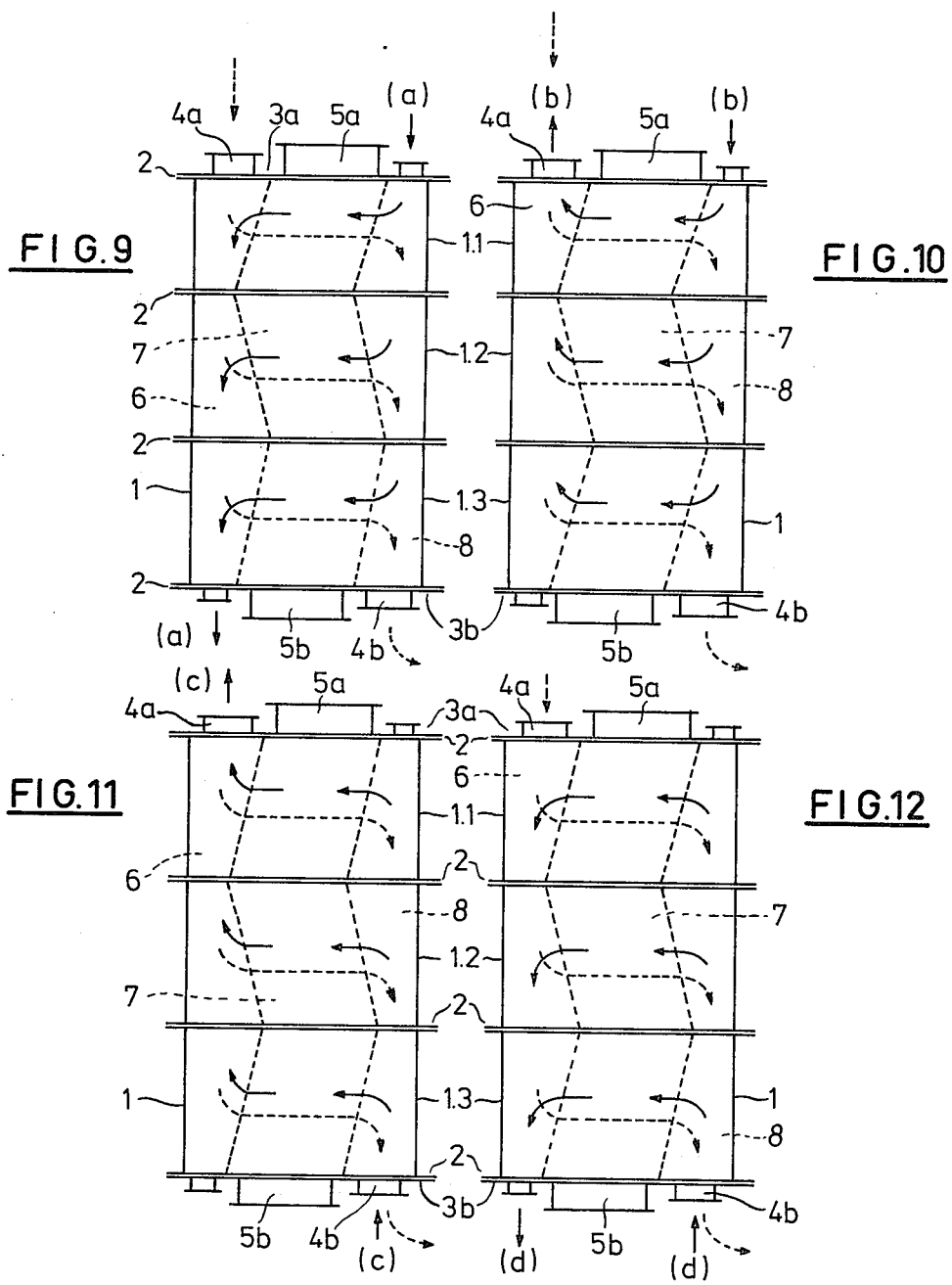

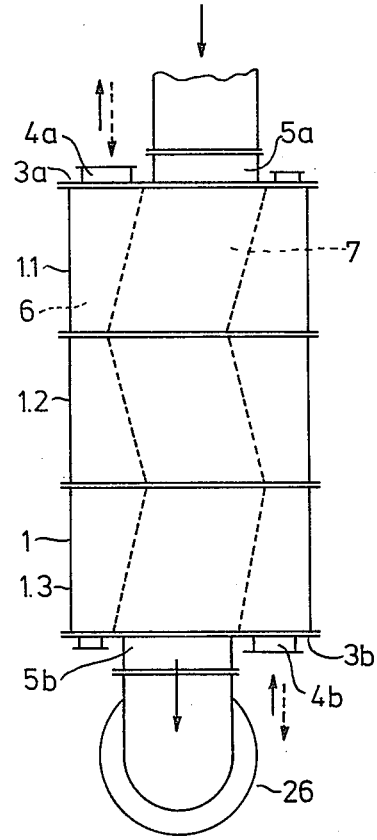
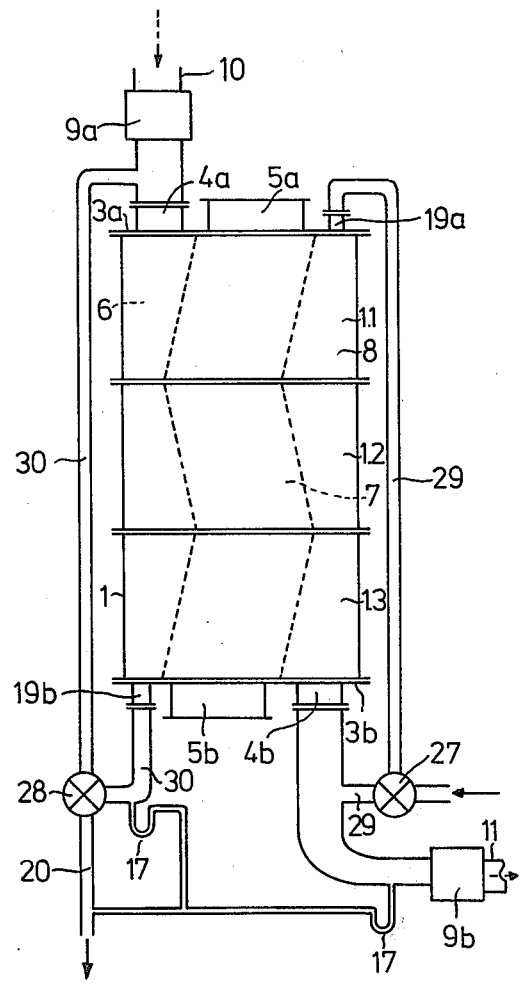
FIG. 14
FIG. 13

APPARATUS OPERATING WITH AN ADSORBENT SUBSTANCE FOR PURIFYING AIR

This invention relates to an apparatus for purifying air or any other gas laden with an absorbate, which operates with active charcoal or with other adsorbent substances, comprising a tank with three chambers extending juxtaposed from one end to the other (inlet chamber, active charcoal chamber and outet chamber), cover closures at the ends and with a tank envelope enclosing the three chambers which is constituted by one section or by a plurality of sections connected together by flanges.

BACKGROUND OF THE INVENTION

Known adsorber installations have the disadvantage of a comparatively unadaptable and therefore expensive mode of tank construction. To enable similar tank elements to be combined to form a larger unit, the tank has been constructed as a horizontal circular cylinder which can be adapted to the capacity required in each case by joining together cylinder sections. In the case however, due to the arrangement of the three tank chambers, each individual cylinder element is provided with a separate inlet and outlet and must be connected by an appropriate pipe system adapted to the particular overall arrangement. Furthermore, this known arrangement has the disadvantage of occupying a large floor surface and the disadvantageous horizontal position of the active charcoal chamber. (German Offenlegungsschrift No. 2,216,672).

In order to permit a uniform and simple method of charging the active charcoal chamber, the active charcoal chamber has been made shaft-shaped with charging through a roof aperture and discharging through a lateral discharge aperture arranged directly above the base of the shaft. But in this case the inlet and outlet chambers are constructed in such a way that an increase in capacity can only be achieved by the use of further similar adsorbers or of a correspondingly larger type of adsorber.

The invention aims at producing an apparatus of the foregoing type which makes it possible with simple means to permit an adaptation to the conditions existing in each case or to varying desiderata, more particularly as regards the capacity of the installation.

SUMMARY OF THE INVENTION

In achieving this aim, the invention starts from the principle that the capacity of an adsorber installation is primarily a function of the magnitude of the inflow surface for the active charcoal chamber, so that it would only be necessary to adapt this inflow surface and the corresponding volume of the active charcoal chamber to the required capacity in each case, if, at the same time it is ensured that the means for supplying the air to be purified and for discharging the purified air are initially dimensioned so that they are adequate for all possible capacity requirements.

Accordingly, the present invention consists in an apparatus operating with an adsorbent substance for purifying air or another gas laden with an adsorbate, comprising a tank having a gas inlet chamber, an adsorbent chamber and a gas outlet chamber in side-by-side juxtaposed relationship and extending from one end of the tank to the other, end face cover closures amd a tank envelope enclosing the three chambers which consists of one piece or of a plurality of sections connected together by flanges, characterised in that in at least one section of the tank envelope the connection zones for the inlet and outlet of gas and adsorbent substance are arranged at the end faces.

By virtue of this arrangement, adaptation to larger capacities can be effected by a simple interposition of separate envelope and chamber sections kept in readiness for this purpose, without requiring additional connections, because these connections are arranged in adjacent sections or at the end face of the tank and it is only necessary to adapt the air pipes to these connections by removing or inserting prefabricated pipe sections, unless it is preferred instead to utilize flexible air pipes.

Tanks with rectangular envelope cross-section are preferably used. Connecting covers may be provided at the two end faces of the tubular tank envelope, so that the adsorber tank is composed of connection-free tubular partial sections and one connecting cover containing the connections at each end face. It is advantageous to conform the chambers so that the end face connecting surfaces exhibit the same shape and subdivision on all the envelope sections, so that a cover or a further envelope section selectively can be connected to both ends faces of all the envelope sections. If the tank is arranged with its envelope vertical, then the active charcoal chamber constitutes a substantially vertical bulk shaft continuous from top to bottom. Any misgivings about the arrangement of the air connections at the end faces of the tank, even when the capacity is increased by lengthening the tank, can be answered by the fact that the available cross-section of the tank is optimally utilized at the connection ends. This can be achieved more particularly by arranging the active charcoal chamber in the tank inclined with respect to the longitudinal axis of the tank, whilst preferably the active charcoal chamber adjoins the end faces of the envelope section in connection regions staggered equally with regard to the median plane, but staggered in mirror image relationship, in each envelope section, so that a zig-zag-shaped pattern of the active charcoal chamber is obtained in the case of the serial arrangement of a plurality of envelope sections. In this manner, and by an appropriate conformation of the cover, a sufficiently wide cross-section can be obtained for the air pipe connections.

In order to extend the size of the tank, it is then in fact necessary in each case to insert tank sections with oppositely inclined adsorbant chamber sections, but at the same time, if it appears to be indicated for the purpose of adapting to the particular space conditions existing, it is possible to use envelope sections of shorter length, the adsorbent chamber of which is more steeply inclined, so that an equally great stagger of the connection regions is obtained as in envelope sections of greater length.

Preferably for particularly high tank columns, it may be advantageous to provide not only envelope sections without side connections, but also envelope sections with side air pipe connections.

By virtue of the construction according to the invention there results the advantageous possibility to gain optimum conditions for desorption in that, for optimization of the desorption effect, the flushing agent is supplied above and/or below to its entrance chamber and conducted away below and/or above out of its exit chamber in such a manner that four modes (capable of being used separately or in combination) of flushing agent flow result:

Flow (a) from above to below,
Flow (b) from below to above,
Flow (c) from above to above,
Flow (d) from below to below.

Such a process ensures not only an optimum basal surface exploitation or cross-section exploitation but, on account of its many-sided possibilities of conducting flow media, it offers simultaneously an optimum adaptation to the adsorption and desorption conditions present in each case.

In the case of adsorption, for the purpose of increasing the gas throughput on the smallest basal surface the chambers for the adsorbent as well as for entry and exit of the gas stream can be enlarged upwardly, with the cross-section remaining the same. The gas charged with the sorbent may be supplied to its entrance chamber above and/or below and conducted away below and/or above out of its exit chamber.

The construction of the activated charcoal chamber as a shaft capable of being connected above and below offers additionally the advantageous possibility that the adsorbent charged up to a predetermined concentration value is drawn off downwardly out of the adsorbent chamber and fresh adsorbent is filled into the adsorbent chamber from above. The fresh adsorbent is able to follow in uninterrupted flow the charged adsorbent sinking downwards in the adsorbent chamber. Also, the renewal of the adsorbent can be accomplished without interruption of the gas flow or the adsorption process in the adsorbent chamber. In the case of application for the purification of air contaminated by radiation energy the charged adsorbent can be discarded environmentally safely, otherwise supplied to a special desorption plant for re-use.

BRIEF DESCRIPTION OF THE INVENTION

In order that the invention may be more readily understood, reference is made to the accompanying drawings which illustrate diagrammatically and by way of example several embodiments thereof, and in which:

FIG. 3 is a side elevation of an embodiment of tank arrangement on a smaller scale, with zigzag-shaped active carbon shaft;

FIG. 4 is side elevation of a further embodiment with continuous inclination of the active charcoal chamber in the same direction through adjacent envelope sections, and with envelope sections with side air pipe connection;

FIG. 8 is a detail of wedge-shaped connecting covers;

FIGS. 9 to 12 illustrate four different types of desorption using the adsorber according to FIG. 3;

FIG. 13 shows the adsorber according to FIGS. 9 to 12 with a device for the switching over of the desorption flow; and FIG. 14 shows the adsorber according to the invention with a device for transport of the adsorbent.

DETAILED DESCRIPTION OF PREFERRED EMBODIMENTS

Figure 1:
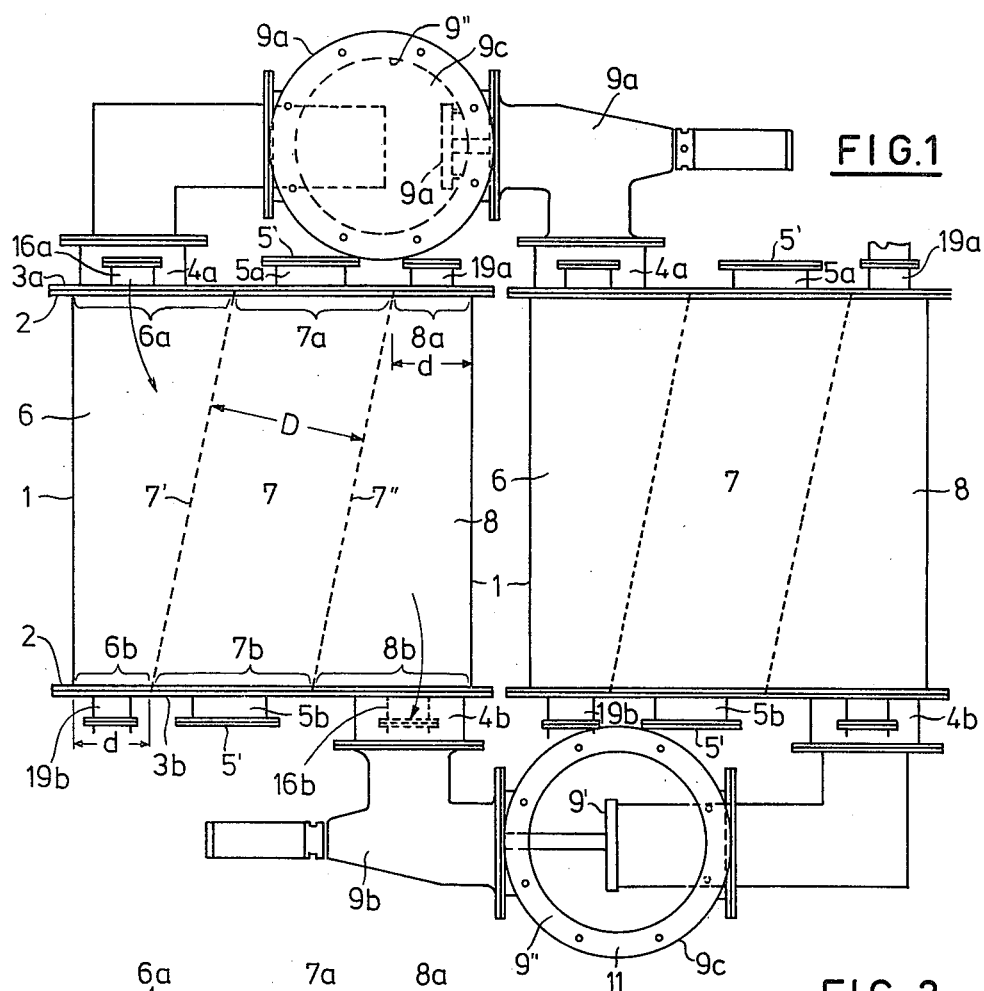
FIG. 1 is a side elevation of a twin tank installation.
Figure 2:
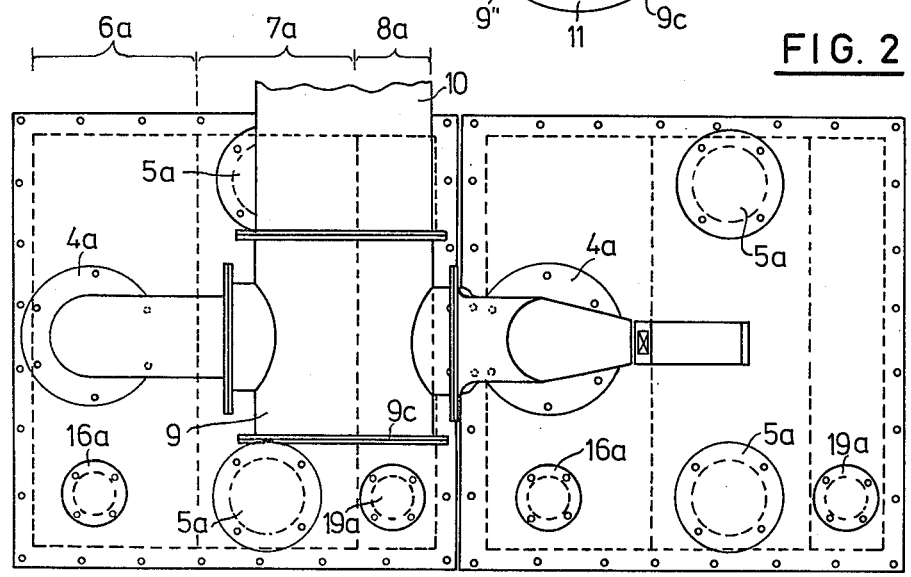
FIG. 2 is a plan of FIG. 1.

The twin tank installation illustrated in FIGS. 1 and 2 comprises two upright cylindrical tanks with rectangular cross-section. The tank casing 1 is provided with flanges 2 at both ends. At its end faces, i.e. at top and bottom, the tank is closed by covers 3a, 3b in which connections 4a, 4b for the inlet and outlet of air and 5a, 5b for the filling and discharging of the active charcoal chamber are provided. The tank space is subdivided into three chambers, namely an inlet chamber 6 for the air to be purified, a chamber 7 to accommodte the adsorbent substance, active charcoal, and an outlet chamber 8 for the purified air. Thus, the connection zones for the inlet and outlet of gas and adsorbent substance are arranged at the end faces through apertures in inlet, outlet and adsorbent portions of the end faces comprising means defining the gas inlet chamber 6, the gas outlet chamber 8, and the adsorbent chamber 7, respectively.

For filling and emptying the active charcoal chamber 7, in the embodiment illustrated, two connections 5a, 5b are provided as filling and emptying apertures, which are arranged on both sides of the air inlet and air outlet connections. These apertures are closable by plates 5' and are provided with a sufficiently high pipe spigot to ensure a snug filling of the active charcoal chambers 7 to below the cover 3a in each case.

The two tanks 1 are interchangeable by two change-over valves 9a, 9b, in order alternately to operate one tank for the adsorption process and the other for the regeneration process. In the drawing the valve closure element 9' closes the air inlet 4a of the right-hand tank, so that the air laden with adsorbate entering the valve chamber 9" from the air supply pipe 10 flows through the left-hand adsorber tank and reaches the air discharge pipe 11 in the purified state through its outlet valve 9b.

Figure 7:
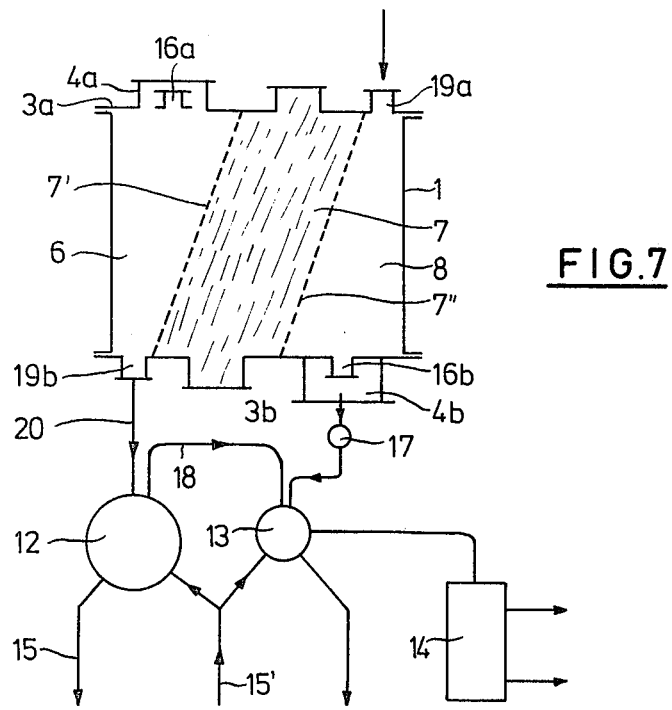
FIG. 7 is a circuit diagram of an installation according to the invention for the regeneration process.

Simultaneously the right-hand adsorber is regenerated. This is effected by flushing with steam with recuperation of the adsorbed adsorbate, e.g. trichloroethylene, desorption and condensation of the mixture of steam and solvent vapour in a condenser by a dry airstream. Referring to FIG. 7, the condenser 12 and cooler 13 are connected in parallel to a cooling water supply pipe 15'. The cooling water heated in the condenser 12 is fed through a pipe 15 to the regeneration steam generator or to another hot water consumer. The steam inlet chamber 7 is provided with a connection 16b to the discharge pipe for steam condensate through a condensate separator 17 into the cooler 13, to which the condensate of the flushing steam and of the solvent vapours is also fed from the condenser 12 through a condensate pipe 18. The steam outlet chamber 6 is provided with a connection 19b for a steam and condensate pipe 20 to the condenser 12. A connection 19a is provided for the steam supply pipe to the steam pipe, and a connection 16a for a pressure security device.

Referring again to FIGS. 1 and 2, the valve chambers 9" of the change-over valves 9a, 9b are each constituted by a pipe section arranged at right angles to the valve stroke axis, which is provided at both ends with flange connections, one for the air pipe 10 or 11 and the other for a sight glass 9c. By this means good supervision of the work function and correct valve position is possible.

The concentration of all the connections in the end connection covers 3a, 3b has the advantage that the actual tank body assumes a particularly simple and connection-free shape, namely the form of a cylinder or pipe section with rectangular, preferably square cross-section, which is provided with flanges 2 only at its end and in which the three chambers 6, 7, 8 extend from the one end face to the other. By virtue of this configuration it is possible to join two or more such tank elements together by a simple connection of their flanges and thereby to multiply the capacity or throughput rate.

The active charcoal chamber 7 is arranged in the tank inclined with respect to the casing, as will be seen from the boundaries 7', 7" of this chamber visible in the drawing. These boundaries are formed, as customary, by grilles or screens and may be regarded as first and second porous dividing means each extending between the end faces separating the gas inlet and gas outlet chambers 6 and 8, respectively, from adsorbent chamber 7 for confining the adsorbate in adsorbent chamber 7 while allowing gas to flow therethrough from gas inlet chamber 6 to gas outlet chamber 8. Guideways (not shown) are provided on the inside of the tank casing for the insertion of the screens. The inclination of these chamber boundaries 7', 7" with respect to the median plane is arranged so that connection zones 7a, 7b are created at the end faces which are staggered an equal distance, but oppositely with respect to the median plane and to the adjacent casing wall except for a free interval d. By this oblique positioning and staggering of connecting zones, optimally wide connecting zones 6a and 8b are available at the end faces for the air intake and discharge respectively, and when a tank column is formed by connecting a plurality of envelope sections, chambers 6, 7 and 8 merging smoothly—i.e. without jumps, into one another and continuous along the total height of the tank column are formed.

The narrower connection zones 6b and 8a of width d serve to accommodate connections 16a, 16b and 19a, 19b of smaller cross-section, which are described in detail hereinbelow.

In the embodiment according to FIG. 3, the connection zones 7a, 7b at the ends of each casing section are offset an equal distance, so that the serial connection of a plurality of casing sections 1.1, 1.2, 1.3 produces a zigzag-shaped pattern of the active charcoal chamber 7. By contrast, FIG. 4 shows an embodiment in which, for the serial connection of a given number of e.g. four casing sections 1.4, 1.5, 1.6, 1.7 with equal inclination of their active charcoal chamber sections in the same direction, the active charcoal chamber 7 adjoins the end faces of the end tank casing sections 1.4, 1.7 in regions staggered an equal distance with respect to the median plane, but in mirror image relationship.

In addition to casing sections without side connections, it is also possible, as FIG. 4 shows, to provide further casing sections 1c with side air pipe connection 4'. These are provided for introducing air to be cleaned in order to obtain a better distribution of air in very high columns. Moreover, such connections may be used where, as shown in dashed lines, a branching of the airstream from or to a connection 4' half way up the column height is desired. In this event the cover 3 with its connections 4a, 5a, 16a and 19a must be removed and placed on the top of the uppermost compartment. The flange 2 of the lowermost dashed line compartment is connected to the flange 2 of the section 1c.

The inlet and outlet chambers 6 and 8 for the air in fact have a width varying along the height in the case of a zigzag-shaped oblique pattern of the active charcoal chamber; this can however immediately be accepted, because it has practically no effect upon the inflow to the active charcoal across the boundary surface 7', provided it is ensured that the transition zone with the interval width d for the gas forms no appreciable flow resistance. In contrast to the inlet and outlet chambers, the active charcoal chamber 7 has the same layer thickness D everywhere, so that in spite of the zigzag-shaped configuration a substantially uniform flow of the adsorbate through the active charcoal and uniform charging of the latter with the adsorbate, is ensured.

As illustrated in FIG. 3, individual tank sections may also be given a smaller height if—and this applies only to a zigzag-shaped pattern—it is ensured by a correspondingly steeper inclination of the active charcoal chamber, that equal staggering of the connection zones 7a and 7b is obtained as in tank sections of greater length, in spite of the smaller height.

As will immediately be realized, even with a single type of tank with tank sections of square cross-section of e.g. 50 cm edge length, it is possible without major outlay to embrace a wide range of air volumes to be processed, so that it is possible to limit manufacture to a small number of types, and for the majority of practical requirements two types, the 50×50 cm type already mentioned, and a second 100×100 cm cross-section type will be sufficient. The formation of tank columns also has the advantage of optimum utilization of space. The shaft form of the active carbon chamber not only has the advantage of simple charging and emptying; it also ensures a uniformly good filling and utilization of the loading capacity. By the oblique positioning of the active charcoal chamber, a considerably larger inflow surface and correspondingly increased capacity is obtained for equal tank size. The covers 3a, 3b with their connections are identical in shape and mutually interchangeable.

In order to limit the active charcoal chamber 7, perforated plates 21 are provided which are slidable in guideways 22 on the inside of the casing and are provided with step bearings 23, 24 for mutual bracing for perforated plates of adjacent casing sections.

Figures 5, 6:
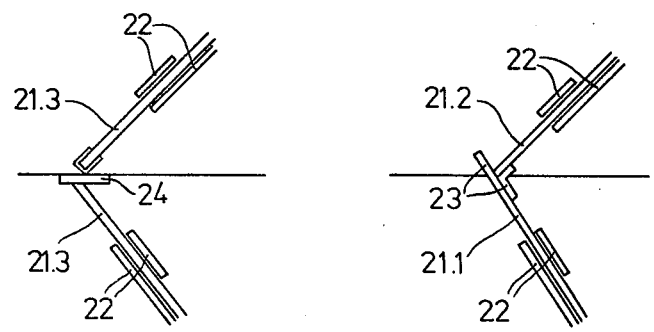
FIG. 5 is a partial side elevation of a first embodiment of active charcoal chamber wall.
FIG. 6 is a similar view of a second embodiment of the active charcoal chamber wall.

FIG. 5 shows an arrangement in which perforated plates 21.1 having step bearings 23 for the perforated plates both of the next higher and also of the next lower envelope section, alternate with perforated plates 21.2 without step bearings. In this case the step bearings are constituted by alternately fitted angle pieces and prolongations of the perforated plates.

FIG. 6 shows an arrangement with step bearings 24 in the form of horizontally aligned bracing plates on the top edges of the perforated plates 21.3. At the upper, and more particularly at the lower end of the active charcoal chamber the perforated plates are provided with edge protecting frames 25 for wear-free bracing against the insides of the covers 3a, 3b which are coated against chemical corrosion.

Many other variations and different constructions are also possible within the ambit of the invention; more particularly, the invention may also find application analogously with tanks of a different cross-sectional shape, for example circular cylindrical tanks. The cross-sections of the connection zones can be utilized to a higher degree by appropriate conformation of the connecting pipe spigots. FIG. 8 shows an embodiment of the connection cover with wedge-shaped cover space 3' adapted to the inclination of the active charcoal chamber, wherein the inflow and outflow surface (not shown for the bottom cover 3b) is drawn into the cover space in such a way that a more uniform inflow to and flow through the active charcoal in the end regions of the active charcoal chamber is ensured with approximately orthogonal end surfaces of the effective active charcoal layer.

The adsorbers according to the invention offer, through their accessibility at both ends, the possibility, as is shown in FIGS. 9 to 12, to optimise the desorption effect in process technology terms by passing steam or other flushing agent selectively, alternately or in combination in four different flow routes through the adsorber since the flushing agent may be fed to its entrance chamber 8 above (FIGS. 9, 10) and/or below (FIG. 11) and conducted away out of an exit chamber 6 below (FIGS. 9, 12) and/or above (FIGS. 10, 11). As a result, four modes (capable of being used separately or in combination) of supplying and taking away the flushing agent, combined with a constant faultless removal of the condensate formed in the desorption (flushing steam condensate and desorbate). These four modes are the flows (a) to (d) shown in FIGS. 9 to 12, viz.

flow (a) from above to below (FIG. 9),
flow (b) from above to above (FIG. 10),
flow (c) from below to above (FIG. 11), and
flow (d) from below to below (FIG. 12).

Furthermore, adsorbers according to the invention offer through their possibility of increasing or decreasing the number of chambers the advantage that the gas throughput on the smallest basal surface can be controlled within wide limits in that, in order to increase the gas throughput, the three chambers of the adsorbent (for the adsorbent as well as for entry and exit of the gas stream) are enlarged in the upward direction (with the cross-section remaining the same). Furthermore, the gas charged with the sorbent can be fed to its inlet chamber 6 above and/or below and taken away from its outlet chamber 8 below and/or above. Such an arrangement is shown in FIG. 13 which shows an adsorber according to FIGS. 9 to 12 having valves 27, 28 for the incoming means for desorption (water vapour) and the outgoing mixture of water vapour and cleaning medium. These valves are arranged in connecting pipes 29, 30 between the upper side and lower side of inlet chamber 8 and outlet chamber 6 of the stream shown by arrows. The valve 27 makes it possible to insert the vapour at the lower and/or upper side of chamber 8. The valve 28 makes it possible to extract the mixture of water vapour and solvent vapour at the upper and/or lower side from chamber 6 towards condenser 12.

Referring to FIG. 14 which is identical to FIG. 11 except that a conveying device 26 is provided, during the adsorption, the adsorbent (charged up to a predetermined concentration value—possibly automatically controlled by concentration measuring instruments arranged at suitable points) can be drawn off downwardly out of the adsorbent chamber by the conveying device 26 and fresh adsorbent can be filled into the adsorption chamber 7 from above, preferably in such a manner that the fresh adsorbent follows in uninterrupted flow the charged adsorbent sinking out of the adsorbent chamber. It is possible to accomplish the renewal of the adsorbent without interruption of the gas flow or of the adsorption process, in contradistinction to hitherto known adsorbers in which the upper and lower covers had to be removed to fill and extract the adsorbent from the adsorption chamber.

In the case of the adsorption of a radiation-energy-contaminated sorbend from an air stream, the charged adsorbent is not regenerated as otherwise usual but, instead, is discarded in environmentally safe manner. If, however, it is a question of an adsorbate which is to be separated in a regeneration process, the charged adsorbent drawn off out of the adsorption chamber can be fed to a separate desorption plant in order to pass on for reutilisation both the adsorbate and the adsorbent after separation in the desorption process.

I claim:

1. An apparatus operating with an adsorbent substance for purifying air or another gas laden with an adsorbate, comprising a tank having a gas inlet chamber, an adsorbent chamber and a gas outlet chamber in side-by-side juxtaposed relationship and extending from one end of the tank to the other, end face cover closures and a tank envelope enclosing the three chambers which consists of a plurality of sections connected at their end faces together by flanges, in at least one section of the tank envelope the connection zones for the inlet and outlet of gas and adsorbent substance being arranged at the end faces through apertures in inlet, outlet and adsorbent portions of said end faces comprising means defining said gas inlet, gas outlet and adsorbent chambers, respectively, and first and second porous dividing means each extending between said end faces separating said gas inlet and gas outlet chambers respectively from said adsorbent chamber for confining said adsorbate in said adsorbent chamber while allowing gas to flow therethrough from said gas inlet chamber to said gas outlet chamber.

2. An apparatus as claimed in claim 1, wherein the tank envelope is a cylinder of a rectangular cross-section.

3. An apparatus as claimed in claim 1, wherein the end face connection surfaces on all the envelope sections have the same shape and subdivision, whereby a cover or a further envelope section is selectively connectable to both end faces of all the envelope sections.

4. An apparatus as claimed in claim 3, wherein identical exchangeable connection covers are provided for both ends.

5. An apparatus as claimed in claim 1, wherein the tank is arranged upright so that the adsorbent chamber forms a substantially vertical bulk shaft extending continuously from bottom to top.

6. An apparatus as claimed in claim 1, wherein the adsorbent chamber is arranged in the tank inclined with respect to the longitudinal direction axis of the tank.

7. An apparatus as claimed in claim 6, wherein the adsorbent chamber in each envelope section adjoins the end faces of the envelope section in connection regions staggered equally but in mirror image relationship with respect to the median plane, so that a zigzag-shaped pattern of the adsorbent chamber is obtained in the case of the serial connection of a plurality of envelope sections.

8. An apparatus as claimed in claim 7, wherein both connection regions of the adsorbent chamber of an envelope section are staggered to a predetermined free minimum interval.

9. An apparatus as claimed in claim 6, which comprise envelope sections of different lengths, wherein in envelope sections of shorter length the adsorbent chamber is more steeply inclined, so that an equal stagger of its connection regions is obtained as in envelope sections of greater length.

10. An apparatus as claimed in claim 6, wherein the connection cover is provided with a wedge-shaped cover space adapted to the inclination of the adsorbent chamber, while the inflow and outflow surface is drawn into the cover space so that the effective adsorbent layer terminates with end surfaces approximately orthogonal to its boundary surfaces.

11. An apparatus as claimed in claim 1, which includes envelope sections having a lateral air pipe connection,
  wherein the adsorbent chamber in envelope sections having a lateral air pipe connection extends parallel to the median plane of the envelope section.

12. An apparatus as claimed in claim 1, wherein two tanks are arranged parallel and are connected to air supply pipe and discharge pipes through changeover valves, the valve chamber of which is constructed as a pipe section arranged transversely to the valve stroke axis, and is provided at both ends with connections, one for an air pipe and the other for a blind flange constructed as a sight glass.

13. An apparatus as claimed in claim 1, wherein in order to delimit the adsorbent chamber, perforated plates slidable into guideways on the inside of the envelope are provided which are provided with step bearings for the mutual bracing of perforated plates of adjacent envelope sections.

14. An apparatus as claimed in claim 13, comprising perforated plates with step bearings for the perforated plates of both the next higher and the next lower envelope section.

15. An apparatus as claimed in claim 14, wherein the perforated plate inclined with respect to the adjacent air chamber is provided with step bearings, whereas the perforated plate placed opposite in the envelope section is supported in step bearings of the perforated plates of the next higher or lower envelope section.

16. An apparatus as claimed in claim 1, wherein both the inlet chamber and the outlet chamber are provided with a connection for condensate discharge.

17. An apparatus as claimed in claim 16, wherein the condenser and cooler are connected in parallel to a cooling water supply pipe.

* * * * *